June 14, 1960

L. BIRKIGT 2,940,246

SPINDLE INCLUDING A CENTRIFUGAL CLUTCH

Filed Oct. 15, 1956

United States Patent Office 2,940,246
Patented June 14, 1960

2,940,246

SPINDLE INCLUDING A CENTRIFUGAL CLUTCH

Louis Birkigt, Pregny-Geneva, Switzerland, assignor to Brevets Aero-Mecaniques S.A., Geneva, Switzerland, a society of Switzerland Filed Oct. 15, 1956, Ser. No. 615,903

Claims priority, application Luxemburg Oct. 15, 1955

3 Claims. (Cl. 57—132)

The present invention relates to apparatus including a centrifugal clutch, the centrifugal weights of which (intended to spread radially under the effects of the centrifugal force) turn together with the driven portion of the clutch, means being provided to create, when said driven portion is deliberately stopped, a residual driving torque which permits of restarting this driven portion when it is no longer kept stationary. My invention is more especially but not exclusively concerned, among these apparatus, with spinning spindle machines driven directly and in particular by means of a worm and worm wheel. In this case, the centrifugal clutch may be disposed either in the worm wheel itself or, preferably, between a part turning together with the worm and a part turning together with the spindle on which is mounted the cop.

Anyway, in the apparatus with which the present invention is concerned, the centrifugal clutch includes resilient means acting in the same direction as the centrifugal force, i.e. so as to urge the centrifugal masses outwardly.

The object of my invention is to provide an apparatus of this kind which is better adapted to meet the requirements of practice than those used up to now.

For this purpose, according to my invention, I provide on the external face of each centrifugal weight a friction lining rigid with this centrifugal weight and preferably made of a material capable of working in oil while having a high friction coefficient (such materials are commonly used for the manufacture of conventional brake or clutch linings). Preferably said lining is in the form of rods extending in the direction of the generatrices of the centrifugal weight and disposed at a distance from one another.

Preferred embodiments of my invention will be hereinafter described with reference to the accompanying drawing, given merely by way of example and in which.

Figure 1:
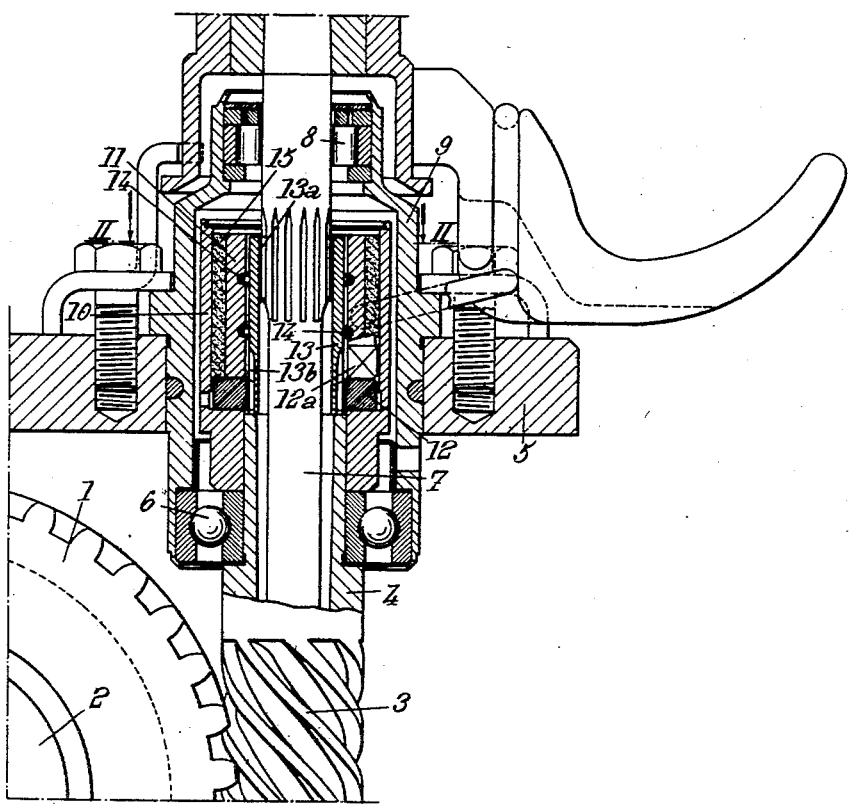
Fig. 1 is an elevational view, with parts shown in section by an axial plane, of a spinning spindle machine made according to my invention.

The machine illustrated by the drawing includes the following elements.

A worm wheel 1 is fixed on a driving shaft 2 journalled in the frame of the machine.

This worm wheel 1 meshes with a worm 3 carried by a sleeve 4 journalled in the casing or frame 5 of the machine by means of a lower bearing (not shown) and of an upper bearing 6 for instance a ball bearing.

Inside sleeve 4 there is mounted with a substantial radial play a spindle 7 the lower end of which advantageously bears on an oscillating pivot supported by casing 5 or by a part rigid with said casing.

Said spindle 7 is held, above the upper bearing 6, by a bearing 8, for instance a roller bearing, adapted to permit small oscillation movements of spindle 7 with respect to sleeve 4, for instance due to the mere functional play of this roller bearing 8, said last mentioned bearing being centered in a sleeve 9 rigid with casing 5.

Spindle 7 is coupled with a sleeve 10 rigid with sleeve 4 and located above the upper ball bearing 6 by means of a centrifugal clutch which will be now more explicitly described.

This centrifugal clutch is made according to an arrangement already described by me in my U.S. Patent No. 2,587,812 and according to which said clutch includes centrifugal weights 11 (for instance two such weights in the form of semi-cylindrical sectors) turning together with spindle 7, means being provided to achieve a residual friction when said spindle is stopped, whereby restarting of the spindle can take place when it is again released.

For this purpose, and as shown by the drawing by way of example, the centrifugal weights 11 are carried by a rotating ring 12 coupled in rotation with said weights by means of teeth 12a or the like. Said ring 12 is coupled with spindle 7 by a sleeve 13 provided at the top with internal splines 13a meshing with corresponding splines of spindle 7 and at the bottom with external splines 13b meshing with corresponding splines carried by ring 12.

Weights 11 are subjected to the action of a resilient system which urges them constantly toward sleeve 10. Such a system is for instance constituted by one or several circular springs 14 which tend to expand radially and to drive centrifugal weights 11 outwardly.

So as fully to explain the advantages of my invention, I must refer to centrifugal clutches of the same kind made prior to said invention.

In a first kind of clutches I experimented, weights 11 were applied directly by their outer walls against the inner wall of the sleeve 10. It was found that the precision of machining of the weights and of the sleeve had to be as high as 2/100 of a millimeter in order to avoid any risk of seizing of the clutch due to defective contact (for instance a linear contact on only one generatrix) of weights 11 against the inner wall of sleeve 10. Of course, the necessity of complying with such high precision requirements involved a very high cost of the clutch, all the more so as weights 11 had to be machined by special machines which were both complicated and costly.

In the second kind of clutches I experimented, the above stated drawback was partly avoided by inserting between the centrifugal weights 11 and sleeve 10 a free intermediate member (for instance a slit sleeve) capable of expanding radially and made of a plastic material having a high friction coefficient and some degree of deformability.

With such a clutch, weights 11 acted on said intermediate member to expand it outwardly and it was necessary to calculate springs 14 so as to make them capable of expanding said intermediate member sufficiently to apply it against the inner wall of sleeve 10. In a machine made on this principle the force of springs 14 had to be about 1,400 grams of force).

On the other hand, due to the fact that the intermediate member of high friction coefficient was free to slide angularly both with respect to sleeve 10 and with respect to centrifugal weights 11, a second braking of the spindle rotating at high speed (12,000 revolutions per minute for instance) caused an intensive heating of weights 11 which could be such as to produce a substantial annealing of springs 14 which then became unable to act correctly to urge the centrifugal weights outwardly. Such a system started very slowly and in some cases it could not start again once it had been stopped.

The present invention is intended to obviate the above stated drawbacks.

According to my invention, instead of mounting the weights 11 so as first to cause them to bear directly against the inner wall of sleeve 10, I provide on the external face of each weight 11 a friction lining member which is rigid with said weights (in opposition to the intermediate friction member above referred to with respect to the second type of clutch I experimented which member was capable of sliding angularly with respect to the centrifugal weights).

Thus, according to the present invention, it becomes unnecessary to machine weights 11 in a very accurate manner, since said weights do not bear directly by their external wall against the inner wall of sleeve 10. On the other hand, any risk of dangerous heating of weights 11 and springs 14 is avoided due to the fact that there is no possibility of angular displacement between the friction lining elements and the centrifugal weights.

Furthermore, since springs 14 are not called upon to expand an intermediate resilient member radially (as in the second case above mentioned) it is possible considerably to reduce the force of said springs.

By way of example it may be pointed out that with the present invention the force of springs 14 could be reduced to 200 grams of force for the type of spindle machine which required springs of 1,400 grams of force when the clutch included a radially expansible friction member (second type of clutch experimented as above stated).

Furthermore, with the kind of clutch according to the present invention, the spindles can be braked for several hours without exaggerated heating (the temperature of the clutch rising to about 40°) nor injury to the elements of said clutch.

Finally, the residual driving torque is quite satisfactory and the spindles start revolving as soon as they are no longer braked.

The material of which the friction lining member is made may be any of the materials that are commonly used for making brake linings or conventional clutch linings, in particular, I may use materials capable of working in oil as used for friction linings of the kind designated by the trademark "Ferodo."

Figure 2:
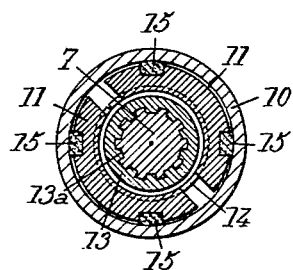
Fig. 2 is a cross section on the line II—II of Fig. 1.

Advantageously, the friction lining elements are in the form of bars 15 extending in the direction of the generatrices of weights 11 and disposed at a distance from one another. For instance every centrifugal weight may carry, as shown by Fig. 2, two rods 15 engaged in grooves provided for this purpose in the external wall of the weight, said rods being advantageously kept in position by wedging in said grooves.

By way of indication it may be stated that, for centrifugal weights the external radius of curvature of which averages 10 mm. and the height of which is 16 mm., good results were obtained by giving each friction rod 15 a length of 16 mm., a width of 3 mm. and a thickness of 2 mm., said rods projecting from the external wall of the centrifugal weight by about 0.5 mm.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An apparatus which comprises, in combination, a driving part having an inner wall in the form of a surface of revolution about an axis, a driven part rotatable in said driving part about the axis of said surface, and centrifugal clutch means mounted between said parts for interconnecting them, said clutch means including centrifugal weights movable radially about the common axis of said parts, means for coupling said weights in rotation with said driven part, at least two friction members secured to each of said centrifugal weights and projecting from the outer side wall thereof so as to cooperate with said inner wall of said driving part for frictional engagement therewith under the action of the centrifugal force, said friction members being made of any of the materials conventionally used for making brake and clutch linings, each of said friction members being in the form of a rib extending at least approximately in the direction of said axis, said friction members being spaced apart from one another and restarting means for urging said centrifugal weights outwardly to start said driven part into rotation.

2. A spinning spindle mechanism which comprises, in combination, a frame, a spindle rotatably mounted in said frame, a driving shaft journalled in said frame, a worm wheel secured to said shaft, a worm in mesh with said worm wheel journalled in said frame, a centrifugal friction clutch including a driving sleeve at least substantially coaxially surrounding said spindle, a driven sleeve interposed between said spindle and said driving sleeve and at least substantially coaxial therewith, centrifugal weights in the form of portions of annular cylinders interposed between said two sleeves movable radially with respect to said driven sleeve, resilient means for urging said centrifugal weights outwardly toward said driving sleeve and at least two friction members secured to each of said centrifugal weights and projecting from the outer side wall thereof to cooperate with the inner wall of said driving sleeve by frictional engagement therewith, said friction members being made of any of the materials conventionally used for making brake and clutch linings, each of said friction members being in the form of a rib extending at least approximately in the direction of the axis of rotation of said spindle, said friction members being spaced apart from one another 3. A spinning spindle mechanism according to claim 2 in which each of said friction members is a rod inserted in said side wall of said centrifugal weight and parallel to the axis of rotation of said spindle.

References Cited in the file of this patent

UNITED STATES PATENTS

| | | |
|---|---|---|
| 1,460,328 | Keyser et al. | June 26, 1923 |
| 2,586,293 | Birkigt | Feb. 19, 1952 |
| 2,587,812 | Birkigt | Mar. 4, 1952 |
| 2,650,465 | Westall | Sept. 1, 1953 |
| 2,788,633 | Birkigt | Apr. 16, 1957 |